Patented Aug. 29, 1939

2,170,800

UNITED STATES PATENT OFFICE 2,170,800

PROCESS FOR MAKING COMPOSITE TITANIUM PIGMENTS

Louis E. Barton, Windsor, Conn., assignor to National Lead Company, New York, N. Y., a corporation of New Jersey No Drawing. Application August 11, 1938, Serial No. 224,299

12 Claims. (Cl. 134—58)

This invention relates to a process for making a composite titanium dioxide pigment, and has for one of its objectives the production of a composite pigment, comprising essentially titanium dioxide intimately and uniformly associated with calcium carbonate.

Composite titanium dioxide pigments, prior to my present invention, have been usually prepared by one of the following methods:

1. The titanium is precipitated by hydrolysis in the form of hydrous titanium oxide from a mineral acid solution of titanium in which the base or extender pigment is suspended and the resulting precipitated composite is separated and subjected to a conjoint calcination.

2. The titanium precipitated by hydrolysis in the form of hydrous titanium oxide from a mineral acid solution of titanium is separated and blended with the base or extender pigment by dispersion and mixing methods, and then the mixture is subjected to a conjoint calcination.

3. The titanium precipitated by hydrolysis in the form of hydrous titanium oxide from a mineral acid solution of titanium is separated and calcined to form titanium dioxide which is then blended with the base or extender pigment.

Methods 1 and 2 above, because of the acid nature of the titanium solution as well as the very acid nature of the precipitated hydrous titanium oxide (due to absorbed or combined acid mother liquor) and the necessity of calcining at high temperatures, permit the use of only such secondary or extender pigment materials as are insoluble in acids and are stable at high temperatures. For example, the sulfates of calcium and barium may be used, but not calcium carbonate.

Methods 3 above described, permits the use of any base or extender pigment material desired, but with some of the extender pigment materials, for instance, calcium carbonate, the method results in fluffy or voluminous products of high oil absorption and relatively low tinting strength and hiding power which are not adapted for use in many types of surface coating compositions. Yet calcium carbonate is a desirable extender material for association with titanium dioxide because, among other reasons, it is almost completely insoluble in water and hence, when associated in a composite pigment with titanium dioxide, the resulting composite may be employed for the preparation of exterior surface-coating compositions.

I have now discovered a method of making a titanium dioxide-calcium carbonate composite pigment by means of which a new product is obtained which is distinguished from products of similar composition, prepared by prior art methods, in having greater apparent density, lower oil absorption and greater tinting strength and hiding power.

In its broadest aspects, my invention comprises a treatment of previously-prepared titanium dioxide-calcium sulfate composite pigment with an aqueous solution of any inorganic carbonate, the electropositive radical or ion of which forms with the sulfate radical or ion (SO$_4$) a water-soluble sulfate. Because of the relative insolubility of calcium carbonate and the appreciable solubility of calcium sulfate, there results in the practice of my invention a transposition of the sulfate radical and the carbonate radical, according to the Law of Mass Action, so that the final product of my invention is a carbonate pigment consisting essentially of titanium dioxide and calcium carbonate. Preferred examples of inorganic carbonates useful in the practice of my invention are the alkali metal carbonates and ammonium carbonate; among the alkali metal carbonates, sodium and potassium are particularly suitable.

In the practice of my invention, any previously-prepared titanium dioxide-calcium sulfate pigment may be employed as the primary material. However, I prefer to use the products obtained from U. S. Patents Nos. 1,680,316 and 1,906,730, in the former of which I am a co-inventor, the latter being granted to Washburn and Aagaard. When the titanium dioxide-calcium sulfate composite material is treated with an aqueous carbonate solution, according to the present invention, the calcium is transformed as aforesaid to carbonate and a chemically equivalent amount of soluble sulfate is formed. The resulting titanium dioxide-calcium carbonate composite pigment, when separated from the sulfate solution, as by decantation or filtration, and after washing and drying, is ready for use as a pigment. It may be subjected to a milling treatment, if desirable or necessary. The sulfate solution, particularly if it is an alkali sulfate, e. g. sodium sulfate, may constitute a valuable by-product of my novel process. The titanium dioxide-calcium sulfate pigment material may be treated with either dilute or concentrated, hot or cold, inorganic carbonate solution, depending upon the internal crystal structure of the calcium carbonate desired in the finished product.

When treated with cold dilute carbonate solution, crystals of calcium carbonate are formed which have the internal crystal structure of calcite, while with hot dilute carbonate solution, crystals of calcium carbonate are formed which have the internal crystal structure of aragonite. When treated with cold concentrated carbonate solutions, the calcium carbonate formed is apparently amorphous, as in limestone, while with hot concentrated carbonate solutions, crystals of calcium carbonate are formed which have the internal crystal structure of aragonite. The treatment of the initial material with the carbonate solution may be conducted with or without agitation, though preferably, at least limited or intermittent agitation is desirable as tending to shorten the time required for complete reaction. For reasons of economy, I prefer to use a fairly concentrated solution. It will be understood that the concentration of the sodium sulfate liquor obtained in the practice of my invention will depend upon and be directly proportional to the concentration of the carbonate solution employed. By proper adjustment of the carbonate solution, it is possible to obtain any desired concentration of sodium sulfate liquor as may be required.

While the variations in concentration of the carbonate solution and the temperature employed during the treatment permit variation in specific gravity and certain other properties of the final composite pigment, obtained from the practice of my invention, the outstanding distinguishing characteristics of my novel products, i. e., greater apparent density, lower oil absorption and greater tinting strength and hiding power, are believed to be largely attributable to my method of using, as a primary material, previously-prepared composite pigments, having their titanium dioxide content intimately associated with very finely divided calcium sulfate, possessing definite crystal structure. Whether the temperature and concentration conditions during the treatment are such as to produce amorphous calcium carbonate or calcium carbonate having the internal crystal structure of either calcite or aragonite, as above described, it appears that the size and external form of the final composite pigment particles, produced according to my present invention, are determined by these same properties of the composite pigment used as a starting material. In other words, while the calcium carbonate may be amorphous or may have the internal crystal structure of either calcite or aragonite, the outward or external form will be pseudomorphic after the original calcium sulfate. Thus, it may be pseudomorphic after gypsum or anhydrite, depending upon what type of composite titanium dioxide-calcium sulfate is used as the initial material. For example, if the composite pigment is made according to the process of U. S. Patent No. 1,680,316, the external crystalline form of the calcium carbonate in the final composite pigment, produced according to the present invention, will be pseudomorphic after gypsum, because the composite titanium dioxide-calcium sulfate pigment, produced according to the method of that patent, consists of particles of titanium dioxide intimately associated with finely divided dehydrated particles of gypsum of acicular crystalline form. On the other hand, if the initial material is produced according to the process of U. S. Patent No. 1,906,730, the final product produced according to the present invention will consist essentially of titanium dioxide particles intimately associated with calcium carbonate particles which are pseudomorphic after anhydrite, because the process of that patent produces a composite titanium dioxide-calcium sulfate pigment in which the titanium particles are intimately associated with calcium sulfate having the crystal structure and crystalline form of anhydrite. It will be understood that regardless of whether the crystalline form of the calcium carbonate is pseudomorphic after either gypsum or anhydrite, the internal crystal structure of the calcium carbonate will be that of calcite, argonite, or even may be amorphous, according to the conditions of concentration and temperature employed in the treatment.

As to temperature, the process of my invention is operable at any temperature from the ordinary room temperature, which is usually about 20° C. to the boiling point of the carbonate solution which, in most cases, will be only a few degrees over 100° C. By preparing the primary titanium dioxide-calcium sulfate composite pigment of the required composition, the proportions of titanium dioxide and calcium carbonate in the final products of my invention may be varied to any composition desired. It is also possible within the scope of my invention to restrict the amount of inorganic carbonate solution to less than that theoretically required for complete conversion of the calcium sulfate into calcium carbonate and thus to obtain a tertiary composite pigment, containing titanium dioxide, calcium carbonate and calcium sulfate.

The following specific example of an actual operation of my invention will make clear the details of the invention and the properties of the resulting product, it being understood that no undue limitations are to be deduced therefrom:

The starting material was a titanium dioxide-calcium sulfate composite pigment made by the process of U. S. Patent No. 1,906,730 and had the following analysis and properties:

| | |
|---|---:|
| Titanium dioxide | 30.4 |
| Calcium sulfate (by difference) | 69.6 |
| Color | 1 |
| Oil absorption | 21.2 |
| Tinting strength | 460 |
| Tinting units per unit TiO$_2$ | 15.1 |

Five hundred parts by weight of this pigment were treated with 272 parts of soda ash dissolved in 2000 parts of water. The batch was allowed to stand, with occasional stirring, for 24 hours, the temperature meanwhile being about 18.5° C. The pigment was then separated by filtration, washed and dried at about 100° C. The yield of product was 408 parts of pigment having the following analysis:

| | |
|---|---:|
| Titanium dioxide | 37.6 |
| Calcium carbonate | 61.8 |
| Color | 1 |
| Oil absorption | 23.5 |
| Tinting strength | 580 |
| Tinting units per unit TiO$_2$ | 15.5 |
| Reaction | Neutral |

A portion of the product was then milled in a chaser mill. The oil absorption of the milled portion was 16.3 lbs. oil per 100 lbs. of pigment.

The product of my invention will be found to possess a greater apparent density, a lower oil absorption, greater tinting strength and hiding power than composite pigments of similar composition prepared by any known methods for blending or mixing calcium carbonate with titanium dioxide or with composite titanium dioxide-calcium sulfate pigments. My novel products are especially useful for surface-coating compositions. Such compositions pigmented with my novel composite pigment are better adapted for use out-of-doors because of the substantial insolubility of the calcium carbonate. They are also excellent materials for pigmenting casein or the like, water paints, rubber, paper, printing inks, aniline inks, etc. They find use in delustering artificial silk as well as in the preparation of leather dressings and preparations for the cleaning and whitening of leather goods, such as shoes, gloves and the like.

The foregoing description of my invention has been given for clearness of understanding and no undue limitations should be deduced therefrom, but the appended claims should be read as broadly as possible in view of the prior art.

I claim:

1. Process for the preparation of a composite titanium dioxide-calcium carbonate pigment which comprises treating a previously-prepared titanium dioxide-calcium sulfate composite pigment with an aqueous colution of an inorganic carbonate the electro-positive ion of which forms with the sulfate ion a water-soluble sulfate until the calcium sulfate of the composite pigment has been transformed into calcium carbonate and separating the composite titanium dioxide-calcium carbonate pigment so produced from the sulfate mother liquor.

2. Process for the preparation of a composite titanium dioxide-calcium carbonate pigment which comprises treating a previously-prepared titanium dioxide-calcium sulfate composite pigment with an aqueous solution of a carbonate selected from the group consisting of alkali metal and ammonium carbonates containing at least an amount of carbonate ion chemically equivalent to the sulfate combined in the calcium sulfate of the composite pigment at temperatures between 20° C. and the boiling point of the carbonate solution until the calcium sulfate of the composite pigment has been transformed into calcium carbonate and separating the composite titanium dioxide-calcium carbonate pigment so produced from the sulfate mother liquor.

3. Process for the preparation of a composite titanium dioxide-calcium carbonate pigment which comprises treating a previously-prepared titanium dioxide-calcium sulfate composite pigment with an equeous solution of a carbonate selected from the group consisting of alkali metal and ammonium carbonates containing less than the theoretical amount of carbonate ion chemically equivalent to the sulfate combined in the calcium sulfate of the composite pigment at temperatures between 20° C. and the boiling point of the carbonate solution until the calcium sulfate of the composite pigment has been partially transformed into calcium carbonate and separating the composite titanium dioxide-calcium carbonate pigment so produced from the sulfate mother liquor.

4. Process for the preparation of a composite titanium dioxide-calcium carbonate pigment which comprises treating a previously-prepared titanium dioxide-calcium sulfate composite pigment with an aqueous solution of sodium carbonate containing at least an amount of carbonate ion chemically equivalent to the sulfate combined in the calcium sulfate of the composite pigment at temperatures between 20° C. and the boiling point of the carbonate solution until the calcium sulfate sulfate of the composite pigment has been transformed into calcium carbonate and separating the composite titanium dioxide-calcium carbonate pigment so produced from the sulfate mother liquor.

5. Process for the preparation of a composite titanium dioxide-calcium carbonate pigment which comprises treating a previously-prepared titanium dioxide-calcium sulfate composite pigment in which the calcium sulfate is selected from the group consisting of calcium sulfate having acicular external crystalline form and calcium sulfate having anhydrite external crystalline form with a hot aqueous solution of a carbonate selected from the group consisting of alkali metal and ammonium carbonates containing at least an amount of the carbonate ion chemically equivalent to the sulfate combined in the calcium sulfate of the composite pigment until the calcium sulfate of the composite pigment has been transformed into calcium carbonate having external crystalline form pseudomorphic after the calcium sulfate of the composite pigment and aragonite internal crystal structure and separating the titanium dioxide-calcium carbonate composite pigment from the sulfate mother liquor.

6. Process for the preparation of a composite titaium dioxide-calcium carbonate pigment which comprises treating a previously-prepared titanium dioxide-calcium sulfate composite pigment in which the calcium sulfate is selected from the group consisting of calcium sulfate having acicular external crystalline form and calcium sulfate having anhydrite external crystalline form with a cold dilute solution of a carbonate selected from the group consisting of alkali metal and ammonium carbonates containing at least an amount of the carbonate ion chemically equivalent to the sulfate combined in the calcium sulfate of the composite pigment until the calcium sulfate of the composite pigment has been transformed into calcium carbonate having external crystalline form pseudomorphic after the calcium sulfate of the composite pigment and calcite internal crystal structure and separating the titanium dioxide-calcium carbonate composite pigment from the sulfate mother liquor.

7. Process for the preparation of a composite titanium dioxide-calcium carbonate pigment which comprises treating a previously-prepared titanium dioxide-calcium sulfate composite pigment in which the calcium sulfate is selected from the group consisting of calcium sulfate having acicular external crystalline form and calcium sulfate having anhydrite external crystalline form with a cold concentrated solution of a carbonate selected from the group consisting of alkali metal and ammonium carbonates containing at least an amount of the carbonate ion chemically equivalent to the sulfate combined in the calcium sulfate of the composite pigment until the calcium sulfate of the composite pigment has been transformed into calcium carbonate having external crystalline form pseudomorphic after the calcium sulfate of the composite pigment and amorphous internal crystal structure and separating the titanium dioxide-calcium carbonate composite pigment from the sulfate mother liquor.

8. As a new composition of matter, a titanium dioxide-calcium carbonate composite pigment in which the calicum carbonate has external crystalline form pseudomorphic after calcium sulfate selected from the group consisting of calcium sulfate having acicular external crystalline form and calcium sulfate having anhydrite external crystalline form.

9. As a new composition of matter, a composite pigment consisting of titanium dioxide, calcium sulfate and calcium carbonate in which the calcium carbonate has external crystalline form pseudomorphic after calcium sulfate selected from the group consisting of calcium sulfate having acicular external crystalline form and calcium sulfate having anhydrite external crystalline form.

10. As a new composition of matter, a composite pigment comprising titanium dioxide intimately associated with calcium carbonate, the latter having internal crystal structure of aragonite and external crystalline form pseudomorphic after calcium sulfate selected from the group consisting of calcium sulfate having acicular external crystalline form and calcium sulfate having anhydrite external crystalline form.

11. As a new composition of matter, a composite pigment comprising titanium dioxide intimately associated with calcium carbonate, the latter having internal crystal structure of calcite and external crystalline form pseudomorphic after calcium sulfate selected from the group consisting of calcium sulfate having acicular external crystalline form and calcium sulfate having anhydrite external crystalline form.

12. As a new composition of matter, a composite pigment comprising titanium dioxide intimately associated with calcium carbonate, the latter having amorphous internal crystal structure and external crystalline form pseudomorphic after calcium sulfate selected from the group consisting of calcium sulfate having acicular external crystalline form and calcium sulfate having anhydrite external crystalline form.

LOUIS E. BARTON.